US012747371B2

(12) United States Patent
Ishii et al.

(10) Patent No.: US 12,747,371 B2
(45) Date of Patent: Sep. 29, 2026

(54) COATING MATERIAL

(71) Applicant: NTT, Inc., Tokyo (JP)

(72) Inventors: Azusa Ishii, Tokyo (JP); Takashi Miwa, Tokyo (JP); Shingo Mineta, Tokyo (JP); Soichi Oka, Tokyo (JP)

(73) Assignee: NTT, INC., Tokyo (JP)

( * ) Notice: Subject to any disclaimer, the term of this patent is extended or adjusted under 35 U.S.C. 154(b) by 588 days.

(21) Appl. No.: 18/257,545

(22) PCT Filed: Dec. 15, 2020

(86) PCT No.: PCT/JP2020/046709

§ 371 (c)(1),
(2) Date: Jun. 14, 2023

(87) PCT Pub. No.: WO2022/130494

PCT Pub. Date: Jun. 23, 2022

(65) Prior Publication Data

US 2024/0150613 A1 May 9, 2024

(51) Int. Cl.
*C09D 1/00* (2006.01)
*C09D 201/00* (2006.01)

(52) U.S. Cl.
CPC ............. *C09D 201/00* (2013.01); *C09D 1/00* (2013.01)

(58) Field of Classification Search
CPC ......... C09D 1/00; C09D 5/106; C09D 201/00
See application file for complete search history.

(56) References Cited

U.S. PATENT DOCUMENTS

| | | | | |
|---|---|---|---|---|
| 2001/0021456 | A1* | 9/2001 | Yamashita | C09D 5/084 428/471 |
| 2011/0294921 | A1* | 12/2011 | Smith | C09D 163/00 523/457 |
| 2014/0048181 | A1* | 2/2014 | Banik | C21D 8/0278 148/318 |
| 2015/0247052 | A1* | 9/2015 | Yamashita | C08K 5/098 428/471 |
| 2017/0218497 | A1* | 8/2017 | Owa | B05D 7/14 |
| 2019/0119521 | A1* | 4/2019 | Xu | C08L 77/08 |
| 2020/0255952 | A1* | 8/2020 | Yamashita | C09D 5/084 |
| 2021/0155808 | A1 | 5/2021 | Miwa et al. | |

FOREIGN PATENT DOCUMENTS

| | | | | |
|---|---|---|---|---|
| JP | H10137683 | A | | 5/1998 |
| JP | 2008144077 | | * | 12/2006 |
| JP | 2011127173 | A | * | 6/2011 |
| JP | 2020169379 | A | * | 10/2020 |
| JP | 2020169380 | A | * | 10/2020 |
| WO | 2017085970 | A1 | | 5/2017 |
| WO | 2020008753 | A1 | | 1/2020 |

OTHER PUBLICATIONS

Kaji et al., human assisted machine translation of WO2017085970, May 26, 2017.*
Machine translation of Fukuike (JP2008/144077), Jun. 26, 2008.*
Machine translation of Yamashita'379 (JP2020/169379), Oct. 15, 2020.*
Machine translation of Yamashita'380 (JP2020/169380), Oct. 15, 2020.*
Machine translation of Hirai (JP2011/127173), Jun. 30, 2011.*

* cited by examiner

*Primary Examiner* — Jun Li
(74) *Attorney, Agent, or Firm* — Slater Matsil, LLP

(57) ABSTRACT

A coating material is a coating material used for applying a coating film made of a zinc-containing material formed in contact with a surface of a metal material and includes a binder, a first inorganic material, and a second inorganic material. The binder includes an organic resin and does not contain metallic zinc and a zinc alloy. The first inorganic material includes a sulfate having a solubility lower than 5 g/100 mL with respect to water. The second inorganic material is soluble in water, exhibits alkalinity if dissolved in water, and has a solubility lower than 5 g/100 mL with respect to water.

16 Claims, No Drawings

COATING MATERIAL

CROSS-REFERENCE TO RELATED APPLICATIONS

This application is a national phase entry of PCT Application No. PCT/JP2020/046709, filed on Dec. 15, 2020, which application is hereby incorporated herein by reference.

TECHNICAL FIELD

The present invention relates to a coating material used for protecting a metal surface of a steel material or the like.

BACKGROUND

There are techniques of forming coatings on surfaces of metal materials such as steel materials using materials containing zinc to prevent the metal materials from being corroded. Examples of materials containing zinc in the techniques include coating materials such as zinc-rich primers or zinc-rich paints with a high concentration of a zinc powder (70 wt % or more in a coating material heating residue) in a formulation and zinc dust paints with a zinc powder content lower than that of these primers or paints in a formulation, hot-dip galvanized materials, zinc thermal spray coatings, and the like. These coating materials may also contain aluminum, aluminum-magnesium alloys, or the like, in addition to zinc in some cases.

Although a coating made of such a zinc-containing material may be used alone in some cases when the coating is formed on a base material, another coating is applied over the coating of the zinc-containing material in many cases. Particularly, zinc-rich primers, zinc-rich paints, and zinc dust paints are used by applying coatings which do not contain a zinc powder over coating films made of these materials.

There are two mechanisms by which a coating (coating film) made of a zinc-containing material exhibits an anti-corrosion effect. First, since this coating contains zinc which has a corrosion potential lower than that of a base metal, the base metal acts as an anode and the contained zinc acts as a cathode in a corrosive environment. Thus, a sacrificial anti-corrosion effect in which corrosion of the base metal is prevented is provided. Second, a protective coating action in which zinc ions eluted from a zinc powder contained in this coating form a protective coating obtained through formation of corrosion products of zinc is provided.

SUMMARY

Incidentally, the anti-corrosion effect of a coating film (coating) using a zinc-containing material is due to the sacrificial anti-corrosion action and the protective film action of zinc. In order to improve the corrosion resistance of coatings made of zinc-containing materials, mixing additives into the zinc-containing materials themselves is common. However, if a substance is added to a zinc-containing material, there is a problem that a content rate of zinc itself, which exhibits anticorrosion properties in a coating film formed for protection, decreases.

The present invention was made to solve the above problems, and an object of the present invention is to add a substance which enhances anti-corrosion properties to a protective film made of a metal material without reducing a content rate of zinc which exerts anti-corrosion properties.

A coating material according to the present invention is a coating material used for applying a coating film formed on a coating made of a zinc-containing material formed in contact with a surface of a metal material, which contains a binder made of an organic resin which does not contain metallic zinc or a zinc alloy, a first inorganic material containing a sulfate having a solubility lower than 5 g/100 mL with respect to water, and a second inorganic material which is soluble in water, exhibits alkalinity if dissolved in water, and has a solubility lower than 5 g/100 mL with respect to water.

As described above, according to the present invention, a substance which enhances anticorrosion properties is added to a protective film of a metal material without reducing a content rate of zinc which exhibits anticorrosion properties.

DETAILED DESCRIPTION OF ILLUSTRATIVE EMBODIMENTS

A coating material according to an embodiment of the present invention will be described below. The coating material according to the embodiment is a coating material used for applying a coating film formed on a coating made of a zinc-containing material formed in contact with a surface of a metal material and contains a binder, a first inorganic material, and a second inorganic material.

The binder is composed of an organic resin and does not contain metallic zinc or a zinc alloy (for example, a powder made of zinc and an alloy thereof including zinc and aluminum or magnesium). The first inorganic material is composed of a sulfate salt having a solubility lower than 5 g/100 mL with respect to water. The first inorganic material can be composed of at least one of sodium sulfate and calcium sulfate.

The second inorganic material is soluble in water, exhibits alkalinity if dissolved in water, and has a solubility lower than 5 g/100 mL with respect to water. The second inorganic material has a pH of 12 or less in a saturated aqueous solution. For example, the second inorganic material can be at least one of phosphate, carbonate, magnesium hydroxide, and magnesium oxide. For example, the second inorganic material can be at least one of barium carbonate, barium hydrogen phosphate, beryllium carbonate, calcium carbonate, calcium hydrogen phosphate, calcium phosphate, lithium carbonate, lithium phosphate, magnesium carbonate, basic magnesium carbonate, magnesium hydroxide, magnesium oxide, and magnesium phosphate.

This coating film is obtained by mixing a first inorganic material and a second inorganic material with a binder (base material of coating material) which does not contain metallic zinc or a zinc alloy.

Here, a mixing amount of the first inorganic material can be 0.5 g or more with respect to 100 g of a heating residue of a coating film (excluding the first inorganic material and the second inorganic material which are mixed in), an amount of the second inorganic material which is mixed in can be 0.5 g or more with respect to 100 g of the heating residue of the coating film (excluding the first inorganic material and the second inorganic material which are mixed in), and a total mixing amount of the first inorganic material and the second inorganic material can be 1 g to 32 g with respect to 100 g of the heating residue of the coating film (excluding the first inorganic material and the second inorganic material which are mixed in).

Here, when the first inorganic material is composed of at least one of sodium sulfate and calcium sulfate, the second inorganic material can be composed of a mixture of magnesium carbonate and magnesium hydroxide or basic magnesium carbonate. Furthermore, a sum of a content amount of the first inorganic material and a content amount of the second inorganic material can be 1 to 32 g with respect to 100 g of the heating residue of the coating film (excluding the first inorganic material and the second inorganic material which are mixed).

Also, the coating can be any of a coating film made of a zinc-rich primer containing at least one of zinc and a zinc alloy containing 70% or more of zinc, a coating film made of a zinc-rich paint containing at least one of zinc or a zinc alloy containing 70% or more of zinc, a coating film made of a zinc dust paint containing at least one of zinc or a zinc alloy containing 70% or more of zinc, a hot-dip galvanized film, and a zinc thermal spray coating.

A more detailed description will be provided below using the results of the experiment.

An "epoxy resin sample coating material" was prepared by mixing a commercially available epoxy resin coating material with the second inorganic material, mixing wA g with 100 g of the heating residue of the resulting coating film (excluding the first inorganic material and the second inorganic material which are mixed), and mixing the first inorganic material with wB g with respect to 100 g of the heating residue of the resulting coating film (excluding the first inorganic material and the second inorganic material which are mixed).

Also, similarly, a "urethane resin sample coating material" was prepared by mixing a commercially available urethane resin coating material with the second inorganic material, mixing wA g with 100 g of the heating residue of the resulting coating film (excluding the first inorganic material and the second inorganic material which are mixed), and mixing the first inorganic material with wB g with respect to 100 g of the heating residue of the resulting coating film (excluding the first inorganic material and the second inorganic material which are mixed).

Five types of base materials Z1, Z2, Z3, Z4, and Z5 were prepared as base materials to be coated with sample materials.

The base material Z1 was obtained by coating a "Blasted SS400 steel plate" which has been subjected to substrate conditioning through blasting processing with a thick-film type organic zinc-rich paint and forming a coating made of a zinc-containing material having a thickness of 60 μm.

The base material Z2 was obtained by causing the SS400 steel plate to corrode using an aqueous sodium chloride solution, and then coating the "corrosion-treated Type 2-cleaned steel plate" which had been subjected to substrate conditioning with Type 2 cleaning (ISO 8501 St3) with a thick-film type organic zinc-rich paint and forming a coating made of a zinc-containing material having a thickness of 60 μm.

The base material Z3 was obtained by coating the "Blast SS400 steel plate" with an inorganic zinc-rich paint and forming a coating made of a zinc-containing material having a thickness of 60 μm.

The base material Z4 was obtained by coating the "corrosion-treated Type 2-cleaned steel plate" with an inorganic zinc-rich paint and forming a coating of a zinc-containing material having a thickness of 60 μm.

The base material Z5 was obtained by causing a zinc-plated steel sheet in which zinc plating is formed as a coating of a zinc-containing material to be exposed to the outdoors for about half a year.

Each of the base materials was a plate material having a flat surface of 150×70 (mm) and a thickness of 3.2 mm. Each of the base materials was coated with each sample paint to have a thickness of 60 μm using brush coating to form a coated test piece. Note that, in the coating performed on the base material Z3 and the base material Z4, each sample coating material was diluted 1.5 times with a solvent and applied using mist coating.

After coating and drying, a "coating film damage part" in which an artificial scratch reaching the base material is formed in the coating film formed in the shape of an "x" using a cutter knife having a small blade and which was for evaluating a sacrificial anti-corrosion action and a protective film action on a part in which the coating film was damaged was prepared in a region of a lower half of each coated test piece.

Coated test piece Nos. 1 to 12 were coated with an epoxy resin sample coating material. Coated test piece Nos. 13 and 14 were coated with a urethane resin sample coating material. Coated test piece Nos. 15 and 16 were obtained by coating the base material with an epoxy resin sample coating material in which the second inorganic material and the first inorganic material were not mixed to a thickness of 60 μm and then coating the coating with an epoxy resin sample coating material in which the second inorganic material and the first inorganic material were mixed to have a thickness of 60 μm.

A combined cycle test in which salt spraying, wetting, and drying were repeatedly performed was performed on each coated test piece. As for test conditions of the combined cycle test, an NTT type combined cycle test was performed for 2000 hours (Reference Literature). For the purpose of evaluating anti-corrosion properties in coastal regions, the "new corrosion test solution (pH 5)" described in the reference literature was used as a test solution. Seawater contained sulfate ions and magnesium ions and affects the corrosion behavior of zinc. Thus, this is because the "new corrosion test solution (pH 5)" could more accurately reproduce the corrosion in the coastal region than the sodium chloride aqueous solution.

Experimental results are shown in a table below. For Z1 to Z4, the rust at a damaged portion of a coating film was evaluated, and classified into "running rust>red rust>red spot rust>white rust" in order of progression of corrosion. Also, for Z5, a swollen width of the damaged portion of the coating film was measured.

If a comparison with a coated test piece 1 of the epoxy resin sample coating material in which the first inorganic material and the second inorganic material are not mixed is performed, the progress of corrosion is significantly reduced in the coated test pieces 2 to 6, 8, and 12 in which calcium sulfate dihydrate or sodium sulfate is used as the first inorganic material and basic magnesium carbonate or calcium hydrogen phosphate is used as the second inorganic material. When the total mixing amount of the first inorganic material and the second inorganic material is 1 g to 32 g with respect to 100 g of the heating residue of the coating material, the significant effects are provided. In addition, the small effects are provided in the case of 48 g exceeding this range (coated test piece 7). This is considered to be due to the influence of the deterioration of corrosion resistance due to the formation of voids in the coating film due to the inorganic salts of the first inorganic material and the second inorganic material being dissolved and eluted in water.

$4MgCO_3 \cdot Mg(OH)_2 \cdot 5H_2O$ in which the effect due to the mixing is confirmed is basic magnesium carbonate and CaHPO4 is calcium hydrogen phosphate, both of which are compounds which dissolve in water and exhibit weak basicity. Zinc is an amphoteric metal and dissolves in strong bases. Thus, if a base (second inorganic material) mixed for the purpose of neutralizing rainwater in the present invention is preferably a weak base and basic magnesium carbonate or calcium hydrogen phosphate, it is considered that zinc corrosion products can be stabilized without advancing zinc corrosion.

However, although the progress of corrosion is slightly prevented compared to the case in which they were not mixed in the coated test pieces 9 and 10 mixed with sodium hydrogen carbonate or disodium hydrogen phosphate as the second inorganic material, the small effect is provided compared to the example using basic magnesium carbonate or calcium hydrogen phosphate as the second inorganic material. Although sodium bicarbonate and disodium hydrogen phosphate are weak bases, this is probably because 5 g or more of the salt dissolves in 100 ml of water and the salt dissolves in the water, creating voids in the coating film, which greatly reduces the corrosion resistance.

In addition to basic magnesium carbonate and calcium hydrogen phosphate, barium carbonate, barium hydrogen phosphate, beryllium carbonate, calcium carbonate, calcium phosphate, lithium carbonate, lithium phosphate, magnesium carbonate, magnesium hydroxide, magnesium oxide, and magnesium phosphate are also thought to be usable as the second inorganic material. Furthermore, these can also be anhydrides or hydrates. In addition, it is also possible to make a compound in which two or more kinds are combined. For example, the basic magnesium carbonate can be a hydrate of a complex salt of magnesium carbonate and magnesium hydroxide represented by $4MgCO_3 \cdot Mg(OH)_2 \cdot 5H_2O$. Furthermore, this ratio is not limited to 4:1:5, but may be, for example, 3:1:3.

Furthermore, although the above is the result of the experiment in which the coated test piece made of the epoxy resin sample coating material is used, it is confirmed that the coated test piece 14 in which basic magnesium carbonate and calcium sulfate dihydrate are mixed shows a significant improvement in corrosion resistance compared to the coated test piece 13 in which the first inorganic material and the second inorganic material are not mixed, regarding the coated test piece made of the urethane resin sample coating material.

It is considered that the present invention can obtain the same effect even if the binder is a coating material composed of a fluorine resin, an oil-modified alkyd resin, a phthalic acid resin, a unsaturated polyester resin, a silicone resin, a modified epoxy resin, alkyl silicate, alkali silicate, acrylic silicate, an acrylic styrene resin, a styrene resin, a polyester resin, chlorinated rubber, a melamine resin, a polyamide resin, a polyimide resin, or the like, in addition to the epoxy resin coating material and the polyurethane resin coating material.

In addition, from the comparison of the coated test piece 15 and the coated test piece 16, even if the base material is coated with the coating material in which the first inorganic material and the second inorganic material are not included to form a one-layer coating film and the coating material is coated with the epoxy resin sample coating material to form a coating film, it is confirmed that the coating film made of the coating material according to the present invention in which the first inorganic material and the second inorganic material are mixed shows significant improvement in corrosion resistance.

The coating film made of the coating material according to the present invention need not to be necessarily formed on and in contact with the coating film. It is confirmed that the effect can be obtained even if a configuration in which the coating film made of the coating material in which the first inorganic material and the second inorganic material are not included is formed on the coating made of the zinc-containing material and a coating film for a bridge according to the present invention is formed over the coating film is provided.

TABLE 1

| Coated test piece No. | A | wA [g] | B | wB [g] | Z1 | Z2 | Z3 | Z4 | Z5 |
|---|---|---|---|---|---|---|---|---|---|
| 1 | No addition | — | No addition | — | Flowing rust | Flowing rust | Flowing rust | Flowing rust | 6 mm |
| 2 | Basic magnesium carbonate | 0.5 | Calcium sulfate dihydrate | 0.5 | Red rust | Flowing rust (smaller than No. 1) | Red rust | Flowing rust (smaller than No. 1) | 4 mm |
| 3 | Same as above | 4 | Same as above | 4 | White rust | White rust + Red spot rust | White rust | White rust + Red spot rust | 1 mm |
| 4 | Same as above | 16 | Same as above | 16 | White rust | White rust + Red spot rust | White rust | White rust + Red spot rust | 1 mm |
| 5 | Same as above | 24 | Same as above | 8 | White rust | White rust + Red spot rust | White rust | White rust + Red spot rust | 1 mm |
| 6 | Same as above | 8 | Same as above | 24 | White rust | White rust + Red spot rust | White rust | White rust + Red spot rust | 1 mm |
| 7 | Same as above | 24 | Same as above | 24 | Red rust | Flowing rust (smaller than No. 1) | Red rust | Flowing rust (smaller than No. 1) | 3 mm |

TABLE 1-continued

| Coated test piece No. | A | wA [g] | B | wB [g] | Z1 | Z2 | Z3 | Z4 | Z5 |
| --- | --- | --- | --- | --- | --- | --- | --- | --- | --- |
| 8 | Calcium hydrogen phosphate | 4 | Same as above | 4 | White rust | White rust + Red spot rust | White rust | White rust + Red spot rust | 1 mm |
| 9 | Sodium bicarbonate | 4 | Same as above | 4 | Red spot rust | Flowing rust (smaller than No. 1) | Red spot rust | Flowing rust (smaller than No. 1) | 3 mm |
| 10 | Disodium hydrogen phosphate | 4 | Same as above | 4 | Red spot rust | Flowing rust (smaller than No. 1) | Red spot rust | Flowing rust (smaller than No. 1) | 3 mm |
| 12 | Basic magnesium carbonate | 4 | Sodium sulfate | 4 | White rust | White rust + Red spot rust | White rust | White rust + Red spot rust | 1 mm |
| 13 | No addition | — | No addition | — | Flowing rust | Flowing rust | Flowing rust | Flowing rust | 8 mm |
| 14 | Basic magnesium carbonate | 4 | Calcium sulfate dihydrate | 4 | White rust | White rust + Red spot rust | White rust | White rust + Red spot rust | 1 mm |
| 15 | No addition | — | No addition | — | Flowing rust | Flowing rust | Flowing rust | Flowing rust | 5 mm |
| 16 | Basic magnesium carbonate | 4 | Calcium sulfate dihydrate | 4 | White rust | White rust + Red spot rust | White rust | White rust + Red spot rust | 1 mm |

Note that, although basic magnesium carbonate is sometimes used as an extender (strengthening agent, reinforcing agent, or modifier), basic magnesium carbonate is applied to the second inorganic material for the purpose of neutralization with basic magnesium carbonate, focusing on the fact that basic magnesium carbonate is a material which is slightly soluble in water and exhibits weak basicity. Thus, this cannot be easily inferred.

Also, although there is a possibility that zinc may not exhibit sufficient anti-corrosion properties in regions in which the coating film is damaged when the pH adjustment using mixing of the second inorganic material causes a corrosion rate of zinc in the coating film made of the zinc-containing material to decrease too much, in the present invention, the anti-corrosion effect of zinc is confirmed even in the damaged portion of the coating film, it is shown (verified) for the first time that a sufficient anti-corrosion effect can be obtained while preventing excessive corrosion of zinc, and the mixing of the second inorganic material is not easily inferred.

Note that, although accelerated corrosion tests are performed using a test solution containing seawater components in the experiment described above assuming corrosion in coastal regions of the sea, it is considered that the effect of the present invention is similar to that of a snow-melting agent containing calcium chloride as a main component. Although seawater contains ions which contribute to the formation of protective rust such as magnesium ions and sulfate ions, the snow melting agent does not contain those ions. It can be easily inferred that, according to the present invention, it is possible to supply sulfate ions or the like to regions in which corrosion is progressing, the generation of protective rust is enabled even in corrosive environments caused by snow-melting agents, and significant anti-corrosion properties are exhibited compared to the case of using a coating film of the first inorganic material and a coating material in which the first inorganic material and the second inorganic material are not mixed.

Also, in the related art, when the coating film over-coated with the zinc-containing material is damaged, the depletion of zinc at this point may become severe, zinc in the vicinity of the formed wound may be consumed, the anti-corrosion effect of zinc may be almost lost, and corrosion of the base metal may progress at once in some cases.

Furthermore, in places in which an insufficient coating film thickness is provided such as edges of metal materials, places in which a coating film has worn away over time, and places in which rust remains on metal materials, or the like, even if there is no scratch on the coating film, zinc may be gradually consumed, voids may be formed, and corrosion factors may easily reach the base metal, causing rust and blistering in many cases.

For these issues, according to the present invention, if a coating film made of a coating material is formed on the coating of the zinc-containing material, it is possible to supply more sulfate ions and the like to regions in which scratches, wear and tear remain and regions in which rust remains, it is possible to generate protective rust in this region, and it is possible to maintain the anti-corrosion effect of the above-described portions and locations.

As described above, according to the present invention, the coating material is composed of the binder made of the organic resin which does not contain metallic zinc or a zinc alloy, the first inorganic material containing a sulfate having a solubility lower than 5 g/100 mL with respect to water, and the second inorganic material which is soluble in water, exhibits alkalinity if dissolved in water, and has a solubility lower than 5 g/100 mL with respect to water. Thus, the substance which enhances corrosion resistance can be added to the protective film made of the metal material without reducing the content rate of zinc which exhibits corrosion resistance.

In order to enhance the corrosion protection of the coating using the zinc-containing material, the mixture is generally added to the zinc-containing material itself. However, when the substance is mixed with the zinc-containing material, there is also the problem that the content rate of zinc itself, which exerts anticorrosion properties, decreases. The inventors investigated the improvement of corrosion resistance by supplying the ions necessary for the formation and stabilization of protective zinc rust not from the zinc-containing material itself, but from the coating film overlaid on this coating. For the purpose of enhancing the anti-corrosion properties of the coating made of the zinc-containing material, the technique of supplying the components necessary for the formation and stabilization of the protective zinc rust from a portion other than the coating of the zinc-containing material is new and cannot be easily inferred.

Specifically, the mixing of a compound which elutes sulfate ions is investigated aiming at the formation of protective rust and the mixing of a compound which dissolves in water and shows alkalinity is investigated aiming at the stabilization of the protective rust by this and for the purpose of neutralizing weakly acidic rainwater. From the viewpoint of stabilizing protective rust, examples of mixing alkaline compounds are not common and cannot be easily inferred.

In addition, it is clarified for the first time in experiments that it is necessary to use those with low solubility in water as these admixtures. In addition, experiments revealed that these admixtures dissolve in water and form voids in the coating film so that excessive mixing reduces corrosion resistance.

Note that it is clear that the present invention is not limited to the embodiments described above and within the technical concept of the present invention and many modifications and combinations can be implemented by those skilled in the art.

[Reference Literature] Takashi MIWA, Azusa ISHIII, and Hiroshi KOIZUMI, "Investigation of Accelerated Corrosion Test Solution that More Accurately Reproduces Atmospheric Corrosion of Zinc in Salt Damage Environment", Materials and Environment 2018 Lecture Collection, B-308, pages 193 to 196, 2018.

The invention claimed is:

1. A coating material for application to a coating film, the coating film being formed in contact with a surface of a metal material and being made of a zinc-containing material, the coating material consisting of:

a binder made of an organic resin which does not contain metallic zinc or a zinc alloy;

a first inorganic material containing a sulfate having a solubility lower than 5 g/100 mL in water; and a second inorganic material which is soluble in water, is alkaline in aqueous solution, and has a solubility lower than 5 g/100 mL in water.

2. The coating material according to claim 1, wherein the second inorganic material has a pH of 12 or less in a saturated aqueous solution.

3. The coating material according to claim 1, wherein the second inorganic material is at least one of phosphate, carbonate, magnesium hydroxide, and magnesium oxide.

4. The coating material according to claim 1, wherein:

a content of the first inorganic material is 0.5 parts by mass or more, a content of the second inorganic material is 0.5 parts by mass or more, and a total content of the first inorganic material and the second inorganic material is 1 part by mass, with respect to 100 parts by mass of a base solid content defined as a total solid content of the coating material excluding the first inorganic material and the second inorganic material.

5. The coating material according to claim 1, wherein the first inorganic material is composed of at least one selected from the group consisting of sodium sulfate and calcium sulfate.

6. The coating material according to claim 5, wherein:

the second inorganic material is composed of basic magnesium carbonate or a mixture of magnesium carbonate and magnesium hydroxide, and a total content of the first inorganic material and the second inorganic material is 1 part by mass to 32 parts by mass, with respect to 100 parts by mass of a base solid content defined as a total solid content of the coating material excluding the first inorganic material and the second inorganic material.

7. The coating material according to claim 1, wherein:

the coating film made of a zinc-containing material is selected from the group consisting of a coating film made of a zinc-rich primer containing at least one of zinc and a zinc alloy containing 70% or more of zinc, a coating film made of a zinc-rich paint containing at least one of zinc and a zinc alloy containing 70% or more of zinc, a coating film made of a zinc dust paint containing at least one of zinc and a zinc alloy containing 70% or more of zinc, a hot-dip galvanized film, and a zinc thermal spray coating.

8. The coating material according to claim 1, wherein the second inorganic material consists of at least one of barium carbonate, barium hydrogen phosphate, beryllium carbonate, calcium carbonate, calcium hydrogen phosphate, calcium phosphate, and lithium carbonate.

9. A coating material consisting of:

a binder made of an organic resin which does not contain metallic zinc or a zinc alloy;

a first inorganic material containing a sulfate having a solubility lower than 5 g/100 mL in water; and a second inorganic material which is soluble in water, exhibits alkalinity if dissolved in water, and has a solubility lower than 5 g/100 mL in water, wherein the coating material is configured to be used for applying onto a coating film in contact with a surface of a metal material, the coating film consisting of a zinc-containing material.

10. The coating material according to claim 9, wherein the second inorganic material has a pH of 12 or less in a saturated aqueous solution.

11. The coating material according to claim 9, wherein the second inorganic material is at least one of phosphate, carbonate, magnesium hydroxide, and magnesium oxide.

12. The coating material according to claim 9, wherein:

a content of the first inorganic material is 0.5 parts by mass or more, a content of the second inorganic material is 0.5 parts by mass or more, and a total content of the first inorganic material and the second inorganic material is 1 part by mass to 32 parts by mass, with respect to 100 parts by mass of a base solid content defined as a total solid content of the coating material excluding the first inorganic material and the second inorganic material.

13. The coating material according to claim 9, wherein the first inorganic material is composed of at least one selected from the group consisting of sodium sulfate and calcium sulfate.

14. The coating material according to claim 9, wherein:

the second inorganic material is composed of basic magnesium carbonate or a mixture of magnesium carbonate and magnesium hydroxide, and a total content of the first inorganic material and the second inorganic material is 1 part by mass to 32 parts by mass, with respect to 100 parts by mass of a base solid content defined as a total solid content of the coating material (excluding the first inorganic material and the second inorganic material.

15. The coating material according to claim 9, wherein:

the coating film made of a zinc-containing material is selected from the group consisting of a coating film made of a zinc-rich primer containing at least one of zinc and a zinc alloy containing 70% or more of zinc, a coating film made of a zinc-rich paint containing at least one of zinc and a zinc alloy containing 70% or more of zinc, a coating film made of a zinc dust paint containing at least one of zinc and a zinc alloy containing 70% or more of zinc, a hot-dip galvanized film, and a zinc thermal spray coating film.

16. The coating material according to claim 9, wherein the second inorganic material consists of at least one of barium carbonate, barium hydrogen phosphate, beryllium carbonate, calcium carbonate, calcium hydrogen phosphate, calcium phosphate, and lithium carbonate.

* * * * *